A. W. FISHER.
SUCTION DEVICE FOR ARTIFICIAL DENTURES AND THE METHOD OF MANUFACTURING SAME.
APPLICATION FILED JUNE 10, 1919.
1,366,644.
Patented Jan. 25, 1921.
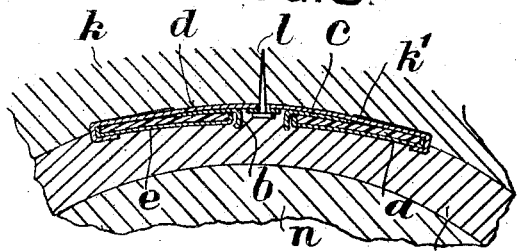
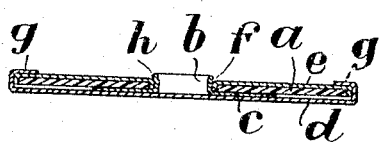
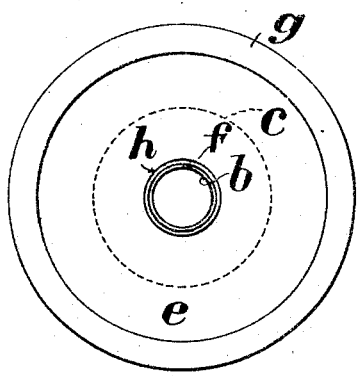
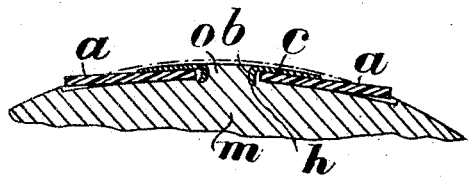
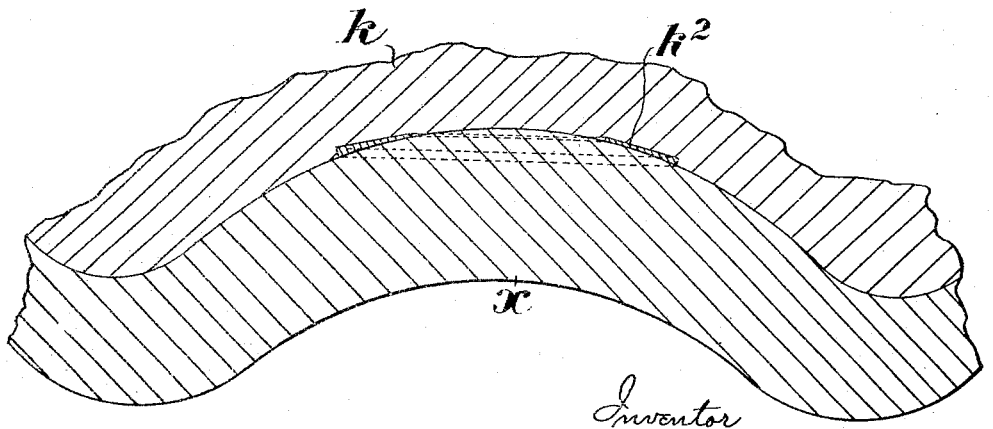
Inventor
Arthur William Fisher,
By [signature] Atty.

UNITED STATES PATENT OFFICE.

ARTHUR WILLIAM FISHER, OF LONDON, ENGLAND.

SUCTION DEVICE FOR ARTIFICIAL DENTURES AND THE METHOD OF MANUFACTURING SAME.

1,366,644.　　　　Specification of Letters Patent.　　Patented Jan. 25, 1921.

Application filed June 10, 1919.　Serial No. 303,043.

*To all whom it may concern:*

Be it known that I, ARTHUR WILLIAM FISHER, a subject of the King of Great Britain, residing at 25 Alba Gardens, Golders Green, London, England, have invented certain new and useful Improvements in and Connected with Suction Devices for Artificial Dentures and Methods of Manufacturing Same, of which the following is a specification.

This invention comprises improvements in and connected with suction devices for artificial dentures and the method of manufacturing same. The suction devices aforesaid are particularly applicable for use in connection with dentures for the upper jaw. Suction disks of this kind operate against the roof of the mouth and, as is known, it is advantageous in some cases to be able to remove and renew the soft india rubber suction disk from a metal button or stud device which is anchored in the vulcanized rubber of the denture.

According to this invention, the shank or neck of the stud or button is inserted through the central perforation of the suction disk, the stud and disk are inclosed in a tin foil or like covering, and the tin foil envelop and its inclosures are positioned accurately in the mold so as to coincide with an annular recess formed in the mold by means of a pliable metal ring which has been burnished on to the wax composition or other impression material. The packing or forming and vulcanization of the denture then takes place. Upon removing the molded articles from the mold, the tin foil is removed and the disk is found securely buttoned to the stud or button which is anchored in the vulcanized rubber.

In order to enable the invention to be readily understood, reference is made to the accompanying drawing in which:—

Figure 1 is a central transverse section of a disk and stud inclosed in the envelop of tin foil or other suitable material preparatory to being placed in the mold.

Fig. 2 is a plan of Fig. 1.

Fig. 3 is a central transverse section of the parts in position in the mold during the packing or forming of the denture.

Fig. 4 is a similar view showing a portion of a denture removed from the mold and having the stud anchored therein, the suction disk being held in position by the stud, and Fig. 5 is a section illustrating the use of the pliable ring on the wax impression for forming the annular recess in the plaster mold, as above referred to.

In Figs. 1, 3 and 4, the thickness of the tin foil is exaggerated for the sake of clearness, as it is in reality much thinner than the rubber suction disk.

Referring to the drawing, $a$ is the soft rubber suction disk with a central perforation through which is inserted the neck or shank $b$ upstanding from a flange or head $c$, the shank and flange together forming the button or stud for fastening the disk $a$ to the denture. The button or stud is suitably formed by taking a disk of gold or aluminium or other suitable material and stamping up the shank or neck $b$ around a central perforation, the shank or stud being then, of course, hollow as shown. The perforation in the suction disk $a$ may be of the same diameter as the external diameter of the shank $b$ or it may be appreciably larger, but, naturally, it is of less diameter than the diameter of the flange $c$. The suction disk $a$ and stud $b\ c$ are then inclosed in tin foil suitably as shown in Fig. 1, that is to say, they may be placed upon an imperforate disk of tin foil $d$, a perforated disk $e$ of tin foil being placed on top with the perforation $f$ concentric with the shank $b$. The inclosure is then made secure by folding over the peripheral edge portions of the tin foil disks somewhat in the manner indicated at $g$, or in any other suitable manner. and the inner peripheral portion around the central hole in the disk $e$ is bent down as shown, so as to protect the edge portion around the hole in the suction disk $a$. The edge portion at the extremity of the shank may be bent over or curved, as indicated at $h$, or it may be toothed or roughened or otherwise formed in known manner for the purpose of giving a good anchorage in the vulcanized rubber of the denture, as will appear from the further description. The parts inclosed in the tin foil $d\ e$ are placed in a mold $k$, Fig. 3, and are secured therein, if desired, by means of a pin $l$ which may be of the flat headed or drawing-pin variety. Or as shown, a pin with a washer head may be employed.

The suction disk inclosed in its tin foil envelop is accurately positioned in the mold $k$ so as to be concentric with the annular recess or cavity $k'$ which is formed in the mold by means of a pliable metal disk or ring $k^2$, Fig. 5. The central portion of the pliable ring $k^2$ is thinner than the peripheral portion which is approximately the thickness of the suction disk and the pliable ring is burnished down on to the wax or composition impression $x$ of the patient's mouth so as to take the contour of such impression and adheres or is caused to adhere temporarily to such impression. The plaster mold $k$, when cast from the impression $x$ has the ring $k^2$ embedded in it, and after detaching the plaster mold and removing the pliable ring therefrom, there is found therein the recess or cavity $k'$ having the shape of the ring and the contour of the palate as imparted to the pliable ring by the burnishing of the latter on to the wax or composition model. The material $m$ for forming the denture is then introduced, and the male part $n$ of the mold is applied, the packing and final forming of the denture being performed in the usual manner. From Figs. 3 and 4, it will be observed that the rubber enters the hollow of the stud and forms a solid neck filling $o$. Owing to the interposition of the thickness of the tin foil disk $d$ between the denture $m$ and the concavity of the mold part $k$, the latter being indicated by chain line in Fig. 4, the top surfaces of the stud flange $c$ and the solid portion $o$ cannot press against the roof of the mouth of the patient and cause discomfort. If the perforation in the suction disk $a$ is of greater diameter than the exterior of the shank $b$ of the stud, care must be taken to secure concentricity of such perforation and shank $b$. For this purpose, adhesive may be applied to the bottom surface of the flange $c$ before placing it upon the tin foil disk $d$, so that after accurately positioning the stud as in Fig. 1, the adhesive will prevent inadvertent shifting of the stud from its concentric position. In the case of the perforation in the suction disk $a$ being larger than the neck of the stud, an annular space will be left around such neck and between it and the edge of the perforation, and the material $m$ will enter into this space and form an annular neck portion surrounding the metal neck of the stud.

After vulcanization, the denture is removed from the mold and the tin foil is torn off, and the suction disk $a$ will then be found secured to the denture $m$ by the flange $c$ of the stud which is fast to the denture $m$ owing to the shank $b$ being anchored to the denture by its embedded bent over edge $h$. When desired, it is a simple matter to remove the suction disk $a$ by unbuttoning it from the stud, whereupon a fresh disk may be buttoned on in its place.

An important feature of these improvements is the molding of the denture with the removable suction disk in its proper position during such molding, the mold having been previously formed with an annular cavity or recess, having the contour of the palate, by means of the pliable disk aforesaid, as this secures the right impression on the denture underneath the disk and also insures that the impression of each individual palate is reproduced at the peripheral portion of the rubber disk. This is very necessary for perfect suction when the denture is first fitted in the patient's mouth. When the denture has been worn for some time, however, the palate of the wearer will have conformed somewhat to the disk and when it becomes necessary to substitute a fresh disk for the old one the palate will conform to any slight differences and perfect suction will again be attained, and not because of such conforming of the palate only, but also because the method of molding adopted has caused the surface of the denture underneath the suction disk to have somewhat of the impression of the roof of the patient's mouth.

I claim:—

1. The method of manufacturing artificial dentures, which consists in arranging a suction disk and a retaining stud in the mold, and molding the denture with both the suction disk and stud in position.

2. For the manufacture of artificial dentures, a mold having mounted therein a suction disk, a retaining stud, a shank formed thereon projecting through the disk, and an envelop inclosing the disk and stud with the exception of the shank of the latter.

3. For the manufacture of artificial dentures an assemblage of parts comprising a suction annulus, a retaining stud having a shank formed thereon threaded through said annulus, and a metal foil wrapper for said disk adapted for exposing the extremity of the shank of said stud during molding.

4. For the manufacture of artificial dentures an assemblage of parts comprising a centrally perforated suction disk, a retaining stud composed of a flat head and a hollow shank having the edge portion of its extremities bent over the shank being passed through the perforation of said disk, and an envelop inclosing said disk and stud head but exposing said shank.

5. For the manufacture of artificial dentures an assemblage of parts comprising a centrally perforated suction disk, a retaining stud composed of a head and a shank the latter being of smaller diameter externally than the diameter of the perforation in said disk through which it is passed, and an envelop comprising a disk portion covering one surface of said suction disk and said head and caused to adhere to the latter and an annular portion covering the opposite surface of said suction disk but exposing said shank.

6. For the manufacture of artificial dentures molded with their suction disks and the retaining buttons of the latter in position, a pliable ring having a greater thickness at the periphery than toward the center, and an impression of the mouth onto which said ring being adapted for being burnished on to an impression of the mouth and for the formation in the mold of a recess for accurately positioning the suction disk and stud in such mold substantiallyl as set forth.

7. The manufacture of artificial dentures comprising burnishing a pliable metal ring on to the impression of a patient's mouth, forming a mold from such impression whereby the imprint of such pliable ring is received in said mold, securing in said mold concentrically with said imprint a suction disk and retaining stud partially enveloped in a metal foil wrapping but with the shank of the stud exposed, packing or molding a denture in said mold whereby the exposed shank becomes embedded in said denture, and the suction disk receives the impress of the mold substantially as set forth.

8. For the manufacture of artificial dentures a combination of parts comprising a centrally perforated rubber suction disk, a hollow metal stud having a shank formed thereon passed through the perforation of said disk, a metal foil wrapper inclosing said disk and the head of said stud but exposing the shank of the latter, and a pliable metal ring having a thickness at its periphery approximately equal to the thickness of said disk but of reduced thickness toward the center substantially as set forth.

ARTHUR WILLIAM FISHER.